(12) United States Patent
Johnson et al.

(10) Patent No.: US 6,970,944 B2
(45) Date of Patent: *Nov. 29, 2005

(54) METHODS AND APPARATUS FOR ROUTING REQUESTS IN A NETWORK

(75) Inventors: Kirk L. Johnson, Boulder, CO (US); M. Frans Kaashoek, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/289,665

(22) Filed: Nov. 7, 2002

(65) Prior Publication Data

US 2003/0061353 A1 Mar. 27, 2003

Related U.S. Application Data

(62) Division of application No. 09/294,837, filed on Apr. 19, 1999, now Pat. No. 6,505,254.

(51) Int. Cl.[7] ............................................. G06F 15/173
(52) U.S. Cl. ...................... 709/238; 709/203; 709/239; 709/242; 709/245; 370/351
(58) Field of Search ............................... 709/238–246, 709/200–203, 217–219; 370/351; 372/219; 710/13, 131, 31; 379/219

(56) References Cited

U.S. PATENT DOCUMENTS 6,052,718 A * 4/2000 Gifford ....................... 709/219
6,304,913 B1 * 10/2001 Rune .......................... 709/241
6,505,254 B1 * 1/2003 Johnson et al. ............. 709/239

FOREIGN PATENT DOCUMENTS

WO    WO 98/31107    * 7/1998

* cited by examiner

Primary Examiner—Bharat Barot
(74) Attorney, Agent, or Firm—Chapin & Huang, L.L.C.; Barry W. Chapin, Esq.

(57) ABSTRACT

A system and method of routing requests received from client computers. The client computer processor is redirected to a router for which the address is within the preferred coverage zone. If a router is not identified for which the address is within a preferred coverage zone, but a router other than the router that received the request is identified for which the address is within a regular coverage zone, the processor is redirected to the router for which the address is within the regular coverage zone. If a message is transmitted from a router behind a firewall to a router outside the firewall, and then a request for data is received from a processor behind the firewall, the processor is redirected to the address of the router. Routers register themselves dynamically into a hierarchy. In another alternative embodiment, a service request from a particular client computer is serviced immediately by the root router rather than redirected to another router. The root router then attempts to find the best source server for the client computer. The next service request from the client computer is dispatched directly by the root router to this best router.

33 Claims, 7 Drawing Sheets

METHODS AND APPARATUS FOR ROUTING REQUESTS IN A NETWORK

CROSS REFERENCE TO RELATED APPLICATION

This patent application is a Divisional of U.S. application Ser. No. 09/294,837, filed Apr. 19, 1999 and entitled "METHODS AND APPARATUS FOR ROUTING REQUESTS IN A NETWORK," now issued U.S. Pat. No. 6,505,254 the entire contents and teachings of which are hereby incorporated by reference herein in their entirety. This patent application is also related to a patent application entitled "Self-Organizing Distributed Appliances," U.S. Pat. No. 6,345,294, issued on Feb. 5, 2002, the entire disclosure of which is hereby incorporated herein by reference. The router described herein may be appliances of the type described in this related patent application.

BACKGROUND OF THE INVENTION

The present invention relates to improved replica routing techniques and dynamic server organization.

In a dynamic server organization system, server requests are originated by client computers (clients). Programs such as browsers on these client computers originate service requests, using the HTTP protocol, in response to end user actions. These service requests are sent to network servers. For example, www.nasdaq.com is an example of such a network server on the Internet. In the system described herein, certain of the network servers are routers. Many types of devices can participate in the system we describe, including network appliances. We will use the terms client computer or browser to refer to any type of system that originates service requests.

Routers serve two functions. The first function of a router is to redirect service requests to other routers that are more suitable to service the request than the router that received the request. The second function of a router is to directly service requests by interpreting and performing the actions contained in the request. We will say that a router services a request when it directly performs a request and returns the result to the computer that sent the service request message. We will say that a router routes a request when it redirects a request to another router for processing. The entire process of deciding which router will service a request is called request routing.

In a hierarchy of routers, request routing can be performed in a restrictive or open manner. Restrictive request routing limits the routers that service a request, in order to optimize network performance. For example, a router may be required to be on the same local area network as the client computer in order to be permitted to service requests from the client. If all routers are operating, a restrictive policy can be used to optimize a desired performance metric. If not all routers are functioning, however, a restrictive policy can reduce the probability that a request can be serviced. Open routing is less restrictive and permits more routers to service a request. For example, any router that is within two network hops of a client may be permitted to service a request. While open routing increases the chances that a request can be serviced, it may not optimize a desired performance metric. One of the contributions of the present invention is a mechanism for combining the best elements of restrictive and open policies for request routing.

U.S. patent application Ser. No. 08/779,770, filed Jan. 7, 1997 entitled "Replica Routing," now issued U.S. Pat. No. 6,052,718, the entire disclosure of which is hereby incorporated herein by reference, discloses replica routing techniques.

It is known to provide statically configured hierarchal network services such as network time protocol (NTP) that use a hierarchial organization to disseminate information (such as time distribution) through the hierarchy so that a root server (which in NTP is a server attached to an atomic clock) is not overloaded with requests.

SUMMARY OF THE INVENTION

One aspect of the invention provides a system and method of routing requests received from client computers. A router receives a request from a client computer for data. The address from which the request purports to originate is compared with coverage zone information for the router that received the request and a hierarchy of routers that are its progeny, the coverage zone information being stored in a database associated with the router that received the request. If the router that received the request is not within a preferred coverage zone as identified in the previous step, the processor is redirected to a router for which the address is within the preferred coverage zone. If a router is not identified for which the address is within a preferred coverage zone, but a router other than the router that received the request is identified for which the address is within a regular coverage zone, the processor is redirected to the router for which the address is within the regular coverage zone.

According to another aspect of the invention, a message is transmitted from a router behind a firewall to a router outside the firewall. The message includes an address of the router behind the firewall. At the router outside the firewall, an apparent source address of the message is compared with the address contained in the message. If the apparent source address fails to match the address contained in the message, information is stored associating the apparent source address and the address contained in the message. At the router outside the firewall, a request is received from a processor for data, and an apparent source address of the request is identified as corresponding to the address contained in the previously received message, based on the stored information. The processor is redirected to the address contained in the previously received message.

According to another aspect of the invention, A) a server, such as a router, in a hierarchy receives a query from a server to be registered and B) sends identification of its children to the server to be registered. C) One of the server that received the query and its children is selected on the basis of its expected online performance with the server to be registered. If the selected server is the server that received the query, D) the server to be registered is attached to the server that received the query. If the selected server is one of the children, E) a query is sent from the server to be registered to the selected server and steps A–E are repeated.

According to another aspect of the invention, a server, such as a router, in a hierarchy is identified to which a server to be registered should be attached. It is determined whether there is a firewall between the server to be registered and the server to which it is to be attached. If there is no firewall between the server to be registered and the server to which it is to be attached, the server to be registered is attached directly to the server to which it is to be attached. If there is a firewall between the server to be registered and the server to which it is to be attached, it is determined whether the server to be registered should be a primary server behind the firewall. If it is determined that the server to be registered should be the primary server behind the firewall, the server to be registered is attached directly to the server to which it is to be attached. If it is determined that the server to be registered should not be the primary server behind the firewall, the server to be registered is attached indirectly to the server to which it is to be attached by attaching it to the primary server behind the firewall, which is attached directly to the server to which the server to be registered is to be attached.

According to another aspect of the invention, a first request is received at a router from a processor for data. The router serves the first request. An address from which the request purports to originate is compared with coverage zone information for the router that received the request and a hierarchy of routers that are its progeny, the coverage zone information being stored in a database associated with the router that received the request, in order to identify one of the routers as a preferred router for serving the processor. The router that received and processed the first request receives a subsequent request from the processor for data. The processor is redirected to the preferred router for serving the subsequent request.

The routing technology provided by the present invention is especially useful for incorporation into appliance-like devices of the type described in the above-mentioned application entitled "Self-Organizing Distributed Appliances." Such appliances do not require manual administration, which would make the appliances expensive to maintain. The present invention allows these appliances to self-organize into routing hierarchies that can provide superior results as compared with manually administered appliances.

DETAILED DESCRIPTION

The system described below provides a mechanism for selecting routers in a computer network to which service requests should be sent, in a real-world networking environment that may include firewalls.

Figure 1:
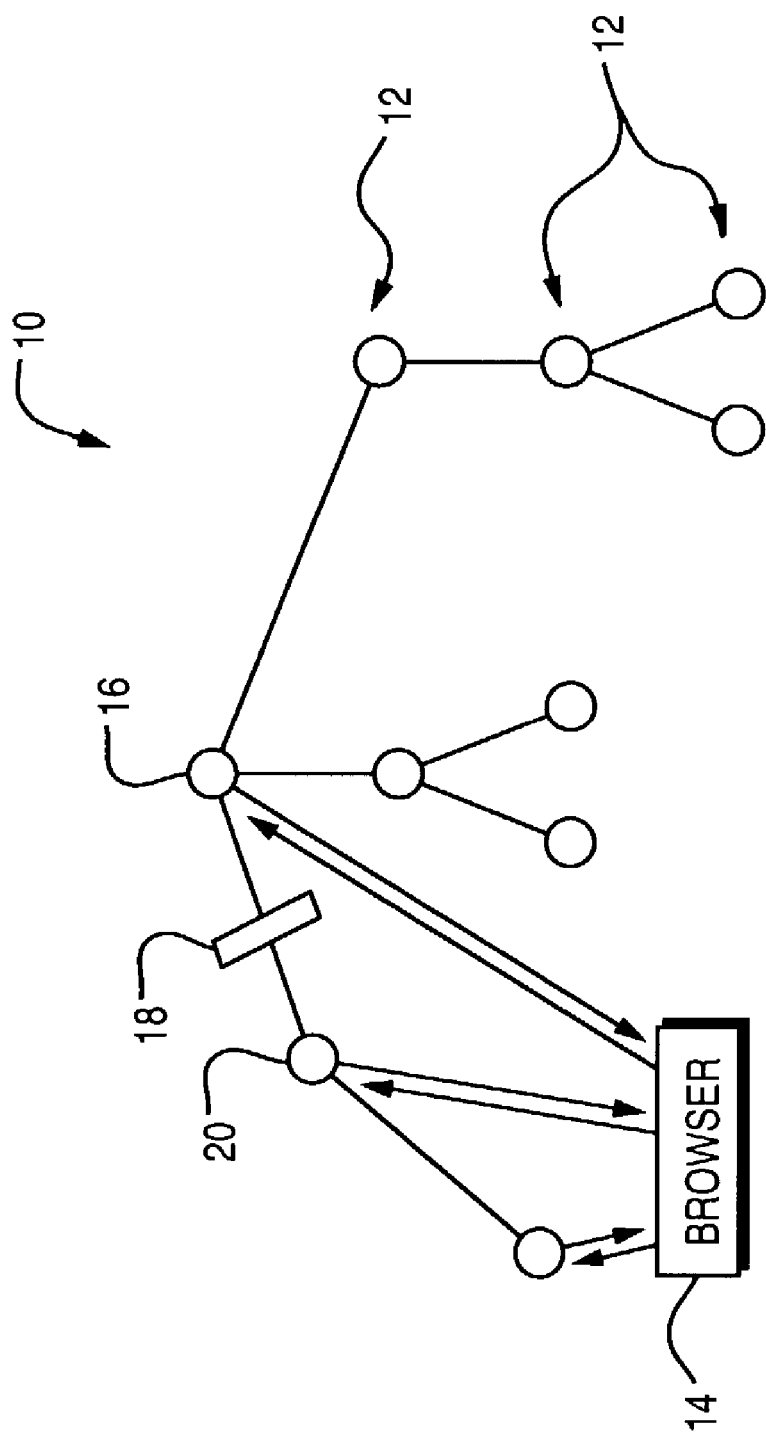
FIG. 1 is a block diagram of a hierarchy of routers according to the invention.

With reference to FIG. 1, the system provides a hierarchy 10 of routers 12, which enables browsers 14 to have requests (in HTTP protocol) serviced by routers that optimize a desired performance metric, such as minimizing network hops or maximizing network bandwidth between a browser and a router. A router can directly service requests for content, or a router can service a request by initiating a real-time data stream to the browser.

The techniques according to which the system operates determines how decisions are made as to where to send requests. The system also provides a graceful fallback for sending requests in cases where complete information about the network is unavailable and therefore it is not possible to determine which router is the right one with which to communicate with different parts of the network. This fallback also provides a fault tolerance capability that accommodates other routers going offline because of a power failure or the like. The system described below continues to provide a level of service in such circumstances.

Each individual router in the routing hierarchy has a notion of two databases of information for purposes of routing: its preferred coverage zone and the regular coverage zone. The preferred coverage zone is a restrictive set of addresses (e.g., a small subnet) for which the router believes that it would essentially be at least as good as any other router at serving a request from one of those addresses. The regular coverage zone is a set of addresses (e.g., a larger subnet) that the router will be willing to serve if a request came from one of the addresses, but for which the router does not know whether that it is an optimal router. The coverage zones are sets of IP addresses associated with the router independent of where the router is located in the routing hierarchy at a particular point in time. The process of making routing decisions is based on the coverage zone information.

In particular, restrictive and open policies are combined. According to a restrictive policy, a router is allowed to serve requests from a relatively small set of addresses. A restrictive policy is useful for very simple heuristics for knowing reasonable coverage areas such as a set of addresses on an immediately connected subnetwork. According to an open policy, in contrast, a router is allowed to serve requests from a relatively large set of addresses. There are simple heuristics that can be used for choosing an open policy that essentially allow any router in a local organization to serve any requests from anywhere in the organization. For example, in an open policy a router could be configured to service any request from a browser that is within two network hops.

The restrictive and open policies are implemented together in a layered fashion. A request is routed according to the preferred restrictive information if possible. If a match is not found, then as a fallback the less restrictive approach is tried, which is more likely to work but not as likely to be optimal.

Each individual router in the routing hierarchy has a notion of two pieces of information for purposes of routing: its preferred coverage zone and the regular coverage zone. The preferred coverage zone is a restrictive set of addresses (e.g., a small subnet) for which the router believes that it would essentially be at least as good as any other router at serving a request from one of those addresses. The regular coverage zone is a set of addresses (e.g., a larger subnet) that the router will be willing to serve if a request came from one of the addresses, but for which the router does not know whether that it is an optimal router. The coverage zones are sets of IP addresses associated with the router independent of where the router is located in the routing hierarchy at a particular point in time. The process of making routing decisions is based on the coverage zone information.

Figure 2A:
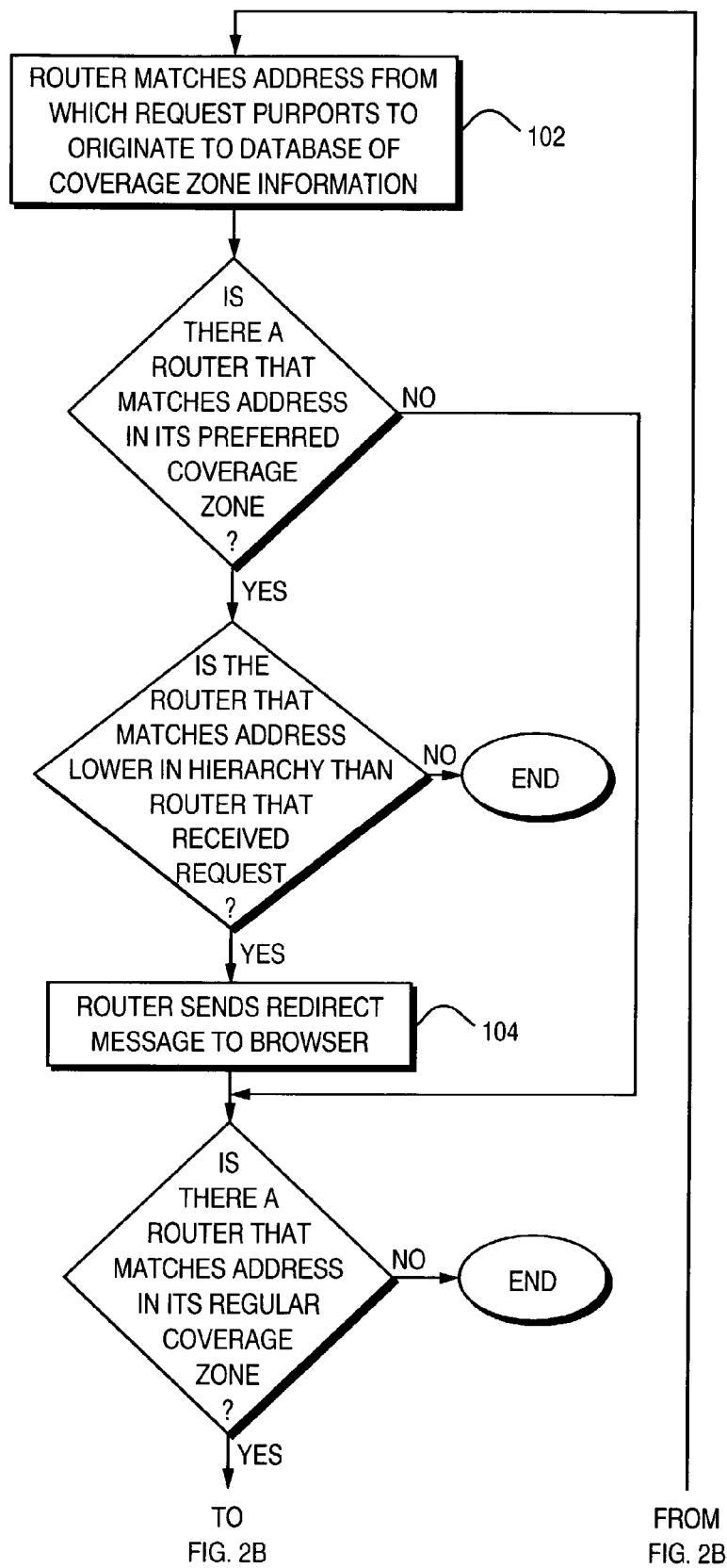
FIG. 2 is a flowchart of the steps of routing data to a browser according to the invention.
Figure 2B:
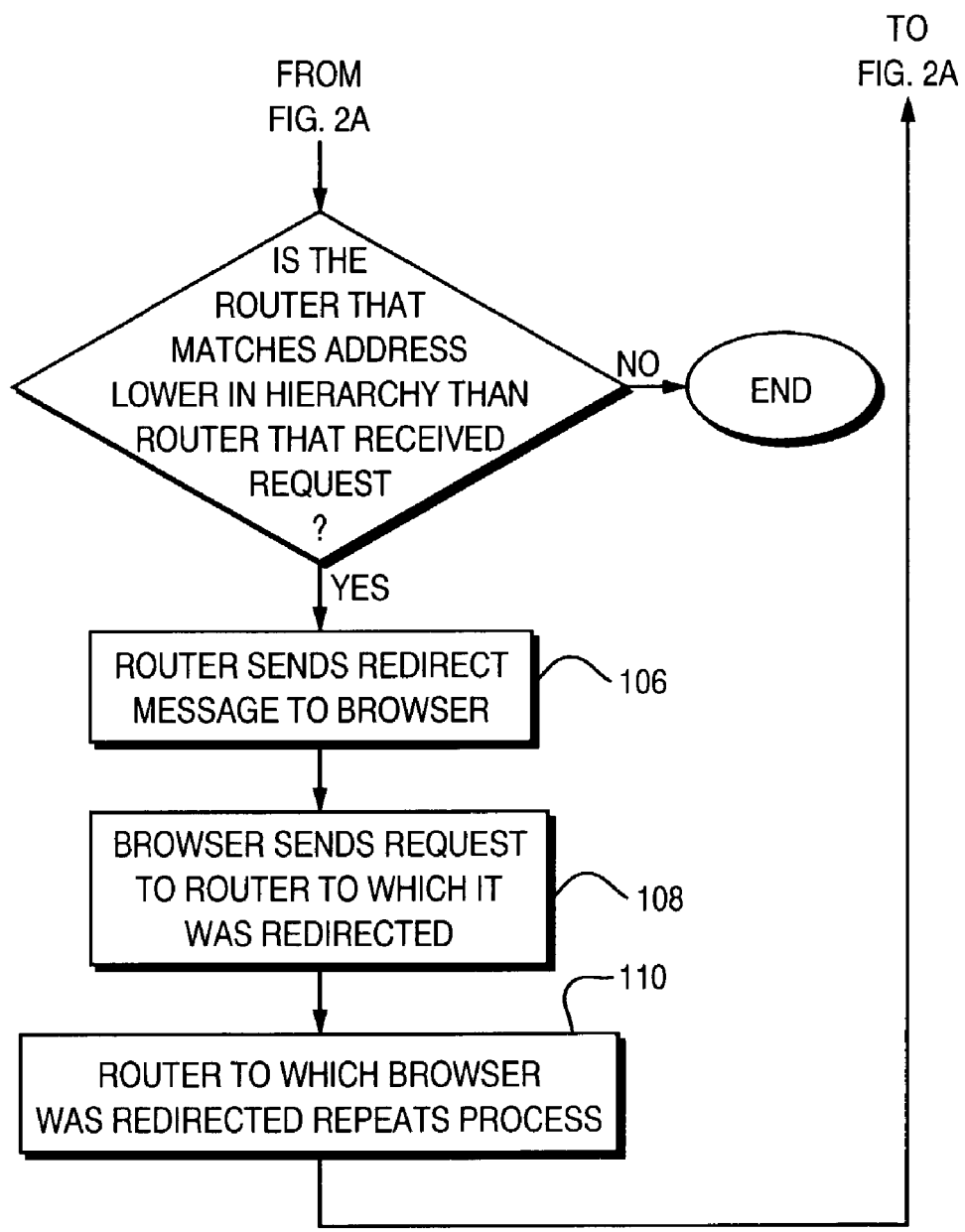

Referring again to FIG. 1, the routers 12 self-organize into a hierarchy 10. As the routing hierarchy is filled, the children in the routing hierarchy propagate their coverage zone information upstream to all of their parents in the routing hierarchy. At the top level of the routing hierarchy there is complete information on all of the children. When an operator of a World Wide Web browser 14 clicks on a universal resource locator (URL) to request a clip of video data, a request for the data is sent to a root router 16 at the top of a routing hierarchy (step 100, FIG. 2). This root router is a router that is higher in the hierarchy than any other router (in subsequent iterations of steps 102–110, however, the "root" router will be a different router, lower in the hierarchy, that is selected in a manner described below). The root router can potentially make an immediate routing decision when it receives such a service request. In particular, the router at the top of the hierarchy can match the address from which the request purports to originate to its database of coverage zone information for itself and all of its progeny (step 102) in order to find a router as low as possible in the hierarchy that matches the address in its preferred coverage zone. If there is more than one such router, the router at the top of the hierarchy may dynamically pick one of them based on load information known to the router at the top of the hierarchy (i.e., information concerning which routers are relatively loaded with handling of service requests) and content information known to the router at the top of the hierarchy (i.e., information about which routers store the data requested by the browser). If such a router can be found, the root immediately sends a redirect message to the browser in order to redirect the browser to the appropriate router (step 104), and if such a router cannot be found, the root attempts to find a router as low as possible in the hierarchy that matches the address in its regular coverage zone and redirects the browser to the appropriate router (step 106). The browser then sends a request to the router to which it was redirected (step 108), and that router repeats the above-described process as a new "root" (step 110) The process stops when a router to which a browser sends or is redirected to send a request concludes that it is the appropriate router to service the request.

The use of redirect messages rather than forwarding is a basic approach to dealing with firewalls, because requests always come from behind a firewall rather than the other direction and responses always travel back through firewalls rather than the other direction. In the routing algorithm, all communications between routers is in a request/response style with the request always going upward (i.e., from the browser's side of a firewall rather than the other direction). As an alternative to sending a redirect message to the browser, a root may instead redirect the browser by sending a list of universal resource locators (URLs), combined with an applet. When the browser runs the applet, the applet cycles through the different URLs to obtain immediate load balancing and fault tolerance.

With reference again to FIG. 1, the repeating of the process at the new "root" is important in the event that there might be firewalls 18 in the hierarchy 10 (if there are no firewalls then the router at which the process is repeated should conclude that it is the appropriate router to provide the data to the browser 14). In particular, for reasons explained below, there must be a primary router 20 behind each firewall 18, and a root 16 located outside a firewall 18 is not allowed to redirect the browser 14 to any router 12 behind such a firewall other than the primary router 20. Thus, if any router located behind the firewall has a preferred coverage zone (or a regular coverage zone, if there are no preferred coverage zone matches) that includes the address of a browser that sent a request to the root, then the appropriate router to which the root will redirect the browser will be the primary router behind that firewall (which may list, as its coverage zone, the IP address of the firewall).

This process is more complicated when service requests pass through firewalls or proxies, because routers on the external side of the firewall or proxy do not necessarily have information about what is on the browser's side of the firewall or proxy. It is more difficult to make decisions because it is not necessarily possible to have complete information about addresses on the browser's side of the firewall or proxy. As used herein and in the claims, therefore, the term "firewall" should be construed to include proxies. Firewalls and proxies usually rewrite source addresses in packets and disallow certain traffic to pass through. In addition, we consider network address translation devices (NAT boxes) to be a type of firewall, as they can obscure the original source address of requests.

As a solution, a mechanism is provided for recognizing when a request comes through a firewall. When a router on an external side of a firewall knows that there is a router on the browser's side of the firewall, the router on the external side of the firewall causes the browser to be directed toward the router on the browser's side of the firewall, as is described in the above-mentioned U.S. patent application Ser. No. 08/779,770. The solution presented herein does not catch every single instance of a request passing through a firewall, but it does catch the instances in which it is actually possible to do something about the fact that the request came through a firewall.

Figure 3:
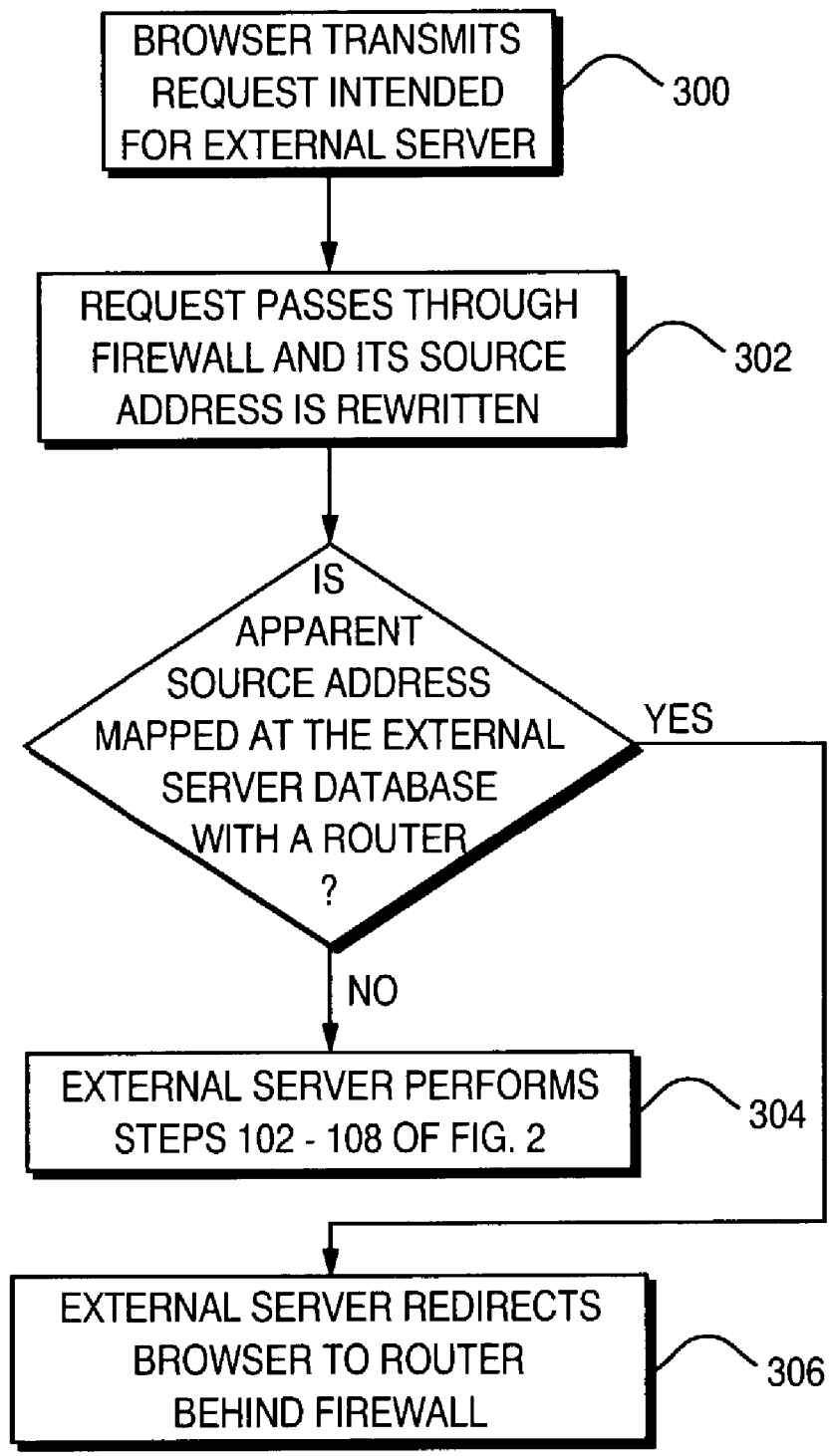
FIG. 3 is a flowchart of the steps of routing data to a browser according to the invention when the request for data passes through a firewall.

With reference to FIG. 3, in the very simplest case, a browser and an external agent server are located on opposite sides of a firewall, but there is no router on the browser's side of the firewall. In this case, when the browser transmits a request intended for the external server (step 300), the request passes through the firewall (step 302), and its apparent source address is rewritten so that it is no longer possible to see the original address, but rather some other address instead. But, because there is no router on the browser's side of the firewall, the best thing for the server on the external side of the firewall to do is simply to reply to the firewall (without even knowing that it is in fact a firewall), because there is no better choice on the browser's side of the firewall. Fortunately, the fact that it is not possible to do anything about the presence of the firewall corresponds to the case in which it is not possible to detect that there is a firewall because there is no way of knowing that the address from which the request came was actually a firewall address and not the address of the actual requester.

In the case in which there is a router on the browser's side of a firewall it will be desirable to be able to redirect to the router on the browser's side of the firewall because it will probably be able to provide better service using private infrastructure on the browser's side of the firewall.

Figure 4:
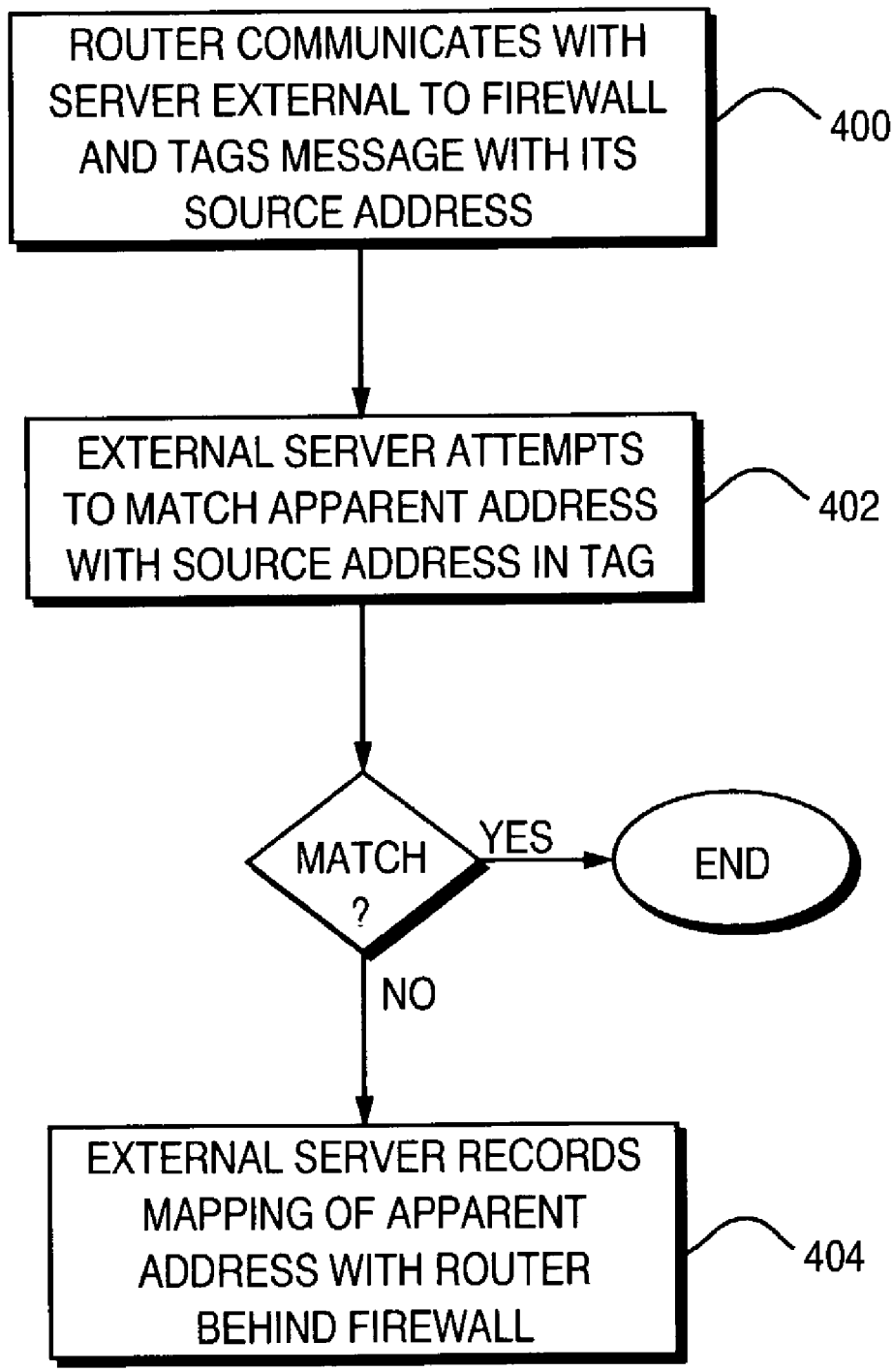
FIG. 4 is a flowchart of the steps for mapping the address of a firewall with a router located behind the firewall, for use in connection with the routing process of FIG. 3.

Turning briefly to FIG. 4, in this case it is possible to tell that a request has passed through a firewall because when the router communicates with the server outside of the firewall, it tags its request with what it thinks its source address is (step 400). When the request arrives at the server outside of the firewall it is possible for that server to try to match the address that that server believes the request came from with the address from which the router believed it came (step 402). If these addresses do not match, it is possible to know that the request passed through a firewall and to record that fact and associate it with the router located behind the firewall. Thus, the server can perform a mapping of the firewall address with a router behind the firewall (step 404).

Referring again to FIG. 3, when a request arrives at such a server from a browser behind a firewall (step 302), it is ordinarily not possible to tell that the request passed through the firewall simply by examining the request. But, because there is a database that associates a certain source address as being an address of a firewall, which database is created as part of the ordinary operation of the recipient of the request, it is possible to redirect to the router on the browser's side of the firewall.

Thus, it is possible for a router located outside of a firewall to know that a router located at a given address behind the firewall has communicated with it previously and has provided its address to it and that the previous request from that router indicated that it came from a different address that must actually be the address of a firewall. Thus, when a request arrives from a browser located behind the firewall, the router located outside the firewall observes that the request purports to be arriving from an address that the router knows to be an address of a firewall rather than a browser. Thus, the router can send the browser a redirect to cause it to contact the router located on the browser's side of the firewall (step 306). However, the router outside of the firewall will not recognize that requests originate from behind the firewall until it receives a message from a router, as opposed to a browser, located behind the firewall. This is the key factor that determines whether the router outside the firewall services the request relayed through the firewall (step 304) or redirects to a router behind the firewall (step 306).

If there are multiple routers, as opposed to a single router, located behind a firewall, then when a request from a browser arrives at a router located outside the firewall, the router outside the firewall cannot identify which router address to redirect to, because the address of the browser computer is not contained anywhere in the message received from the browser. The router outside the firewall knows only the address of the firewall. Even if the router outside the firewall knows about the coverage zones of the routers behind the firewall, it does not know the coverage zone of the particular browser. As a consequence, a rule is followed that the routing hierarchy is built in a manner such that only one of the routers behind the firewall is known by routers on the external side of the firewall. All other routers on the browser's side of the firewall have to be subordinate directly or indirectly to the one at the top of the chain inside that firewall.

This scheme solves the problem of multiple routers behind a firewall, because when a router outside the firewall receives a request, it may know that there are multiple routers behind the firewall but it also knows that one of the routers is the preferred top of the local routing hierarchy behind the firewall. The router redirects the request to that router, and that router can make the decision as to whether it is appropriate for it to serve the data or whether it would be more appropriate for it to delegate in a recursive manner by redirecting the request to another router.

The recursive delegation is not performed by any special mechanism once the routing decision is delegated to another router. Rather, the router to which the decision is delegated solves the routing problem as if it were the top router in the hierarchy. The router to which the decision is delegated has the actual address of the router that originated the request. If there is another firewall behind the first firewall, then a layering of the entire above-described process can take place.

The selection of a router behind a given firewall as the top of the hierarchy behind the firewall could be arbitrary, based, for example, on which router is the first router that happens to access a router outside the firewall. Every other router will then be required to support the router at the top of the hierarchy. For purposes of routing this scheme would actually work, but for the purposes of efficient information distribution, this scheme is not optimal. In order to improve efficiency of information distribution, it is important to build a routing hierarchy in a more appropriate manner.

A slightly more complicated but very implementable alternative to the above-described scheme for building a hierarchy is to make online measurements. For example, in the course of normal operations, when a router boots up, it can register itself with the routing hierarchy by finding a place for itself in the existing hierarchy. The process of registering is itself a navigational process that begins at the top of the hierarchy, where the router decides whether it should attach itself to the top router (the "root") or to one of the top router's children. The router picks the "best" of the children and determines whether it would be better to be attached to that child rather than to the top. If so, then the process starts over at that child. The determination of whether one location is better than another may be implemented in a manner described below, and may be defined in different embodiments in terms of different metrics, including highest bandwidth, lowest latency, greatest reliability, etc. (in certain embodiments there can be multiple equivalent "best" locations if the relevant metric for each of these locations is within a given range). Thus, the router can explore a path down through the routing hierarchy. In the process of exploring this path during the normal registration process, the router can recognize whether a path in the hierarchy crosses a firewall, because the router has available to it information indicating which routers in the hierarchy believe that proxies, network address translation devices, or firewalls are located between themselves and other routers. The router that is exploring the hierarchy can perform an online measurement to determine whether it should be a better choice to be at the top of the hierarchy behind the firewall, as compared with an existing router at that location.

This process is implemented by storing some information about how good the existing router at a given point in the hierarchy is at communicating across its links, using some performance metric such as latency or bandwidth, and comparing that information with the performance metric for the router that is (exploring the network. The performance metric for the router that is exploring the network is obtained through an online measurement by that router. If the router exploring the network decides it is better than an existing router at the top of the hierarchy behind a firewall, it substitutes itself in the hierarchy and instructs the existing router to detach itself underneath it. Thus, the hierarchy can change at any time. Each router, in deciding for itself whether it is the best router to be at the top of the hierarchy behind a firewall, coordinates that knowledge with a router higher in the overall hierarchy, on the external side of the firewall.

An external router on the external side of the firewall tracks this same information. There are two ways for the external router to do this. One way is for the external router to trust the routers not to be Byzantine. The external router trusts them to follow the rules that they should follow. And then when the external router is informed that a certain router has elected itself as the top router behind the firewall, the external router notes the change. Everything will work, because when requests arrive from behind a firewall, all that the external router needs to know is which router is the top router behind that firewall. Everything else will take care of itself due to the recursive delegation described above. If the external router wants to protect against an inefficient arrangement of the hierarchy, then the external router can essentially maintain the same information that the routers use to make decisions as to the structure of the hierarchy, or can develop long-term weighted averages of performance metrics in order to filter out the effects of transients in the network. These techniques provide a double check of the decisions that the routers make.

Alternatively, the external router could implement a scheme according to which the routers make measurements but do not make decisions concerning where they should be in the hierarchy. The routers simply note the existence of firewalls and make measurements of how good they are at transmitting across the firewalls, and then report the information to the router or external router that is higher in the hierarchy. The external router can be a central repository of the information, and it can also be the decision-maker to say whether a report received from a router that is attempting to enter the hierarchy indicates that that router is better than any existing child of the external router. If so, then the external router instructs the new router to be a take ownership as a parent of that child and its progeny, based on the measurements that are reported by the routers to the external router. Thus, there is more than one way to create the routing topology.

In any event, it is important for the external router to be the agent of record of which router is the primary router behind the firewall, because the external router must have this information in order to route correctly.

The taking of the above-described measurements is related to the bandwidth-efficient information dissemination. For purposes of ordinary routing, it does not really matter which router is at the top of a hierarchy behind a firewall, because the requests will bounce from router to router and will eventually arrive at to the right place without consuming a lot of bandwidth. Information flow, however, which might involve actually pushing a video out to a thousand routers, for example, requires careful arrangement of the routing topology in a manner that makes precious use of critical resources in the network. Thus, the topology of the routing hierarchy is not particularly relevant to the routing process, but it can be critical for purposes of efficient bandwidth use for information distribution.

Because, in this specific embodiment, the routers are also server replicas, it is especially important that the network links leading to the root (or a primary router behind a firewall, which functions as a root within a private network infrastructure) must not become overloaded. Accordingly, the routing hierarchy guides decisions about the routers from which browsers obtain data. As is described above, when a browser needs to obtain data, it does not obtain this data from the root of the hierarchy if a router further down the hierarchy is as good or better in terms of including the browser within its preferred or regular coverage zone. If the router further down the hierarchy does not actually have the data, that router requests the data from its parent, which can request it from its parent if necessary, and so on. By respecting the routing hierarchy, it is possible to control the number of browsers that obtain data directly from the root, because when the data is in fact obtained from the root, over a critical network link, it is distributed among routers in local parts of the hierarchy. Thus, only one router accesses the data from the root and distributes it amongst its peers in the more local part of the network. Moreover, another advantage of using the routing hierarchy to determine how to perform data distribution is that the routers lower in the hierarchy to which a browser is redirected can be expected to be in faster network connectivity with the browser than is the root, simply by virtue of how the hierarchy was constructed. In other words, the routing process naturally detects and takes advantage of a local organization's routers, which is crucial to cutting bandwidth usage.

All messages between routers are authenticated using message-based authenticators, as is described in the above-mentioned U.S. patent application Ser. No. 08/779,770. The use of message-based authenticators ensures that attacks cannot be made on the self-organization algorithm of the routers.

If data such as a video file needs to be pushed to all routers in a hierarchy, the root may push the data to its children only, and then the children can push the content further down the tree. In this way, load on the root is minimized as well as network bandwidth consumption. In another embodiment, source nodes and routers can be distinct. In this embodiment, requests can be routed by routers to source nodes where the requests are serviced. This embodiment has the advantage that existing source nodes can be used in the architecture without the need to add routing functionality, and, furthermore, routing nodes do not need to maintain a copy of content to be served. In this embodiment, routers process all requests using the same logic as described above. Additional information is kept by routers that describes source nodes including their preferred and regular coverage zones. Routers can discover source nodes by manual configuration or by receiving automatic advertisement messages from source nodes. When a request is delegated to a source node that does not have routing functionality, it will immediately be serviced. If a source node needs to acquire new content, it can use a service request to locate another source node in accordance with the techniques described herein. When source nodes and routers are co-hosted on computers, the optimal arrangement of a routing hierarchy according to the techniques described herein can ensure that information is efficiently distributed through the network.

The critical resources in the routing hierarchy are the heavily loaded backbone, the parts of the network that get overloaded when a high-bandwidth job is performed. In fact, the critical resource is not so much the routers but rather the network between the routers and browsers that request data from the routers. This problem raises the question of how good the routing hierarchy must be, in terms of whether it is arranged based on very good information or only mediocre information. This raises the question of how good the information must be that is used to build a routing hierarchy that exceeds a required threshold of suitability.

Using analytical modeling techniques it is possible actually to synthetically build, for a given imaginary network topology with routers scattered in various places, every possible routing hierarchy. For small network topologies and numbers of routers this is easy to do. Then it is possible to take averages of measurements for each possible hierarchy, using statistical confidence intervals.

It is easy to demonstrate that for small networks it does not matter how the hierarchy is constructed. A random construction is essentially as good as an optimal one within very small performance factors. But, not surprisingly, for large networks of hundreds or thousands of routers, the performance factor or loading factor on the heavily-used links increases essentially linearly for random, poorly-chosen network topology and it stays essentially constant for a good network topologies. Thus, there is a linear performance advantage of constructing good hierarchies as one scales up to very big networks, which is a crucial to good routing of data. The difference in performance between a good hierarchy and a poorly constructed hierarchy can be, essentially, the difference between a constant factor times thousands of browsers pulling video data over a critical network backbone versus a constant factor no matter how many browsers pull data over the backbone.

It is important to decide how good the hierarchy must be, and how much measurement information is required to achieve the requisite level of performance. According to one approach, instead of using a very precise model that associates each link with a particular bandwidth, the bandwidth of each link is ranked according to an arbitrary scale, according to which link is better than another. For all practical purposes, as long as the rank ordering of the different network links is consistent with their real rank order in terms of absolute performance, then the offline metric for choosing the best arrangement (optimal arrangement of links within the hierarchy in terms of bandwidth) tends to choose the same one, or the same isomorphic set of best solutions as compared with an online metric that specifically identifies bandwidth for each link. Thus, it turns out that the precision on each link is not very relevant, as long as an arbitrary scheme of ranking maintains an absolute identification of which link is better than another. As long as the links are in the correct order, it is not necessary to know what the numbers are for each link as long as it can be known which one is higher than another. The important piece of information to understand is which link is more expensive than others, because the expensive link is the link of greatest concern, and the other links are of lesser concern.

The offline technique described above shows that it is possible to dynamically construct the hierarchy without relying on exact information the bandwidth of each link and the extent to which the link is loaded. It does not need to have the precise information, but just has to have a rough sense of which link is more expensive than another.

As a consequence, in order to make a dynamic, online measurement to understand a good choice of hierarchy, it is not necessary to perform a dynamic measurement that requires many megabytes of data across to be sent across a link in order to measure the transfer rate with a high degree of precision. Rather, all that may be required is to ping another router or exchange a packet or small amount of data with the other router to determine what the latency is, because in general, latency and bandwidth are related. Worse bandwidth usually means higher latency. Better bandwidth usually means lower latency. All that is required to determine the latency along the path between two routers is a simple round-trip measurement between a router that desires to find its place in the hierarchy and other routers as the new router navigates its way down from the top. To measure both bandwidth and latency, two measurements can be performed with two requests of different sizes.

Regardless of whether or not there is a firewall between a new router and another router, if the new router determines that it should communicate with another router in order to measure bandwidth or latency, the new router initiates the conversation.

Figure 5A:
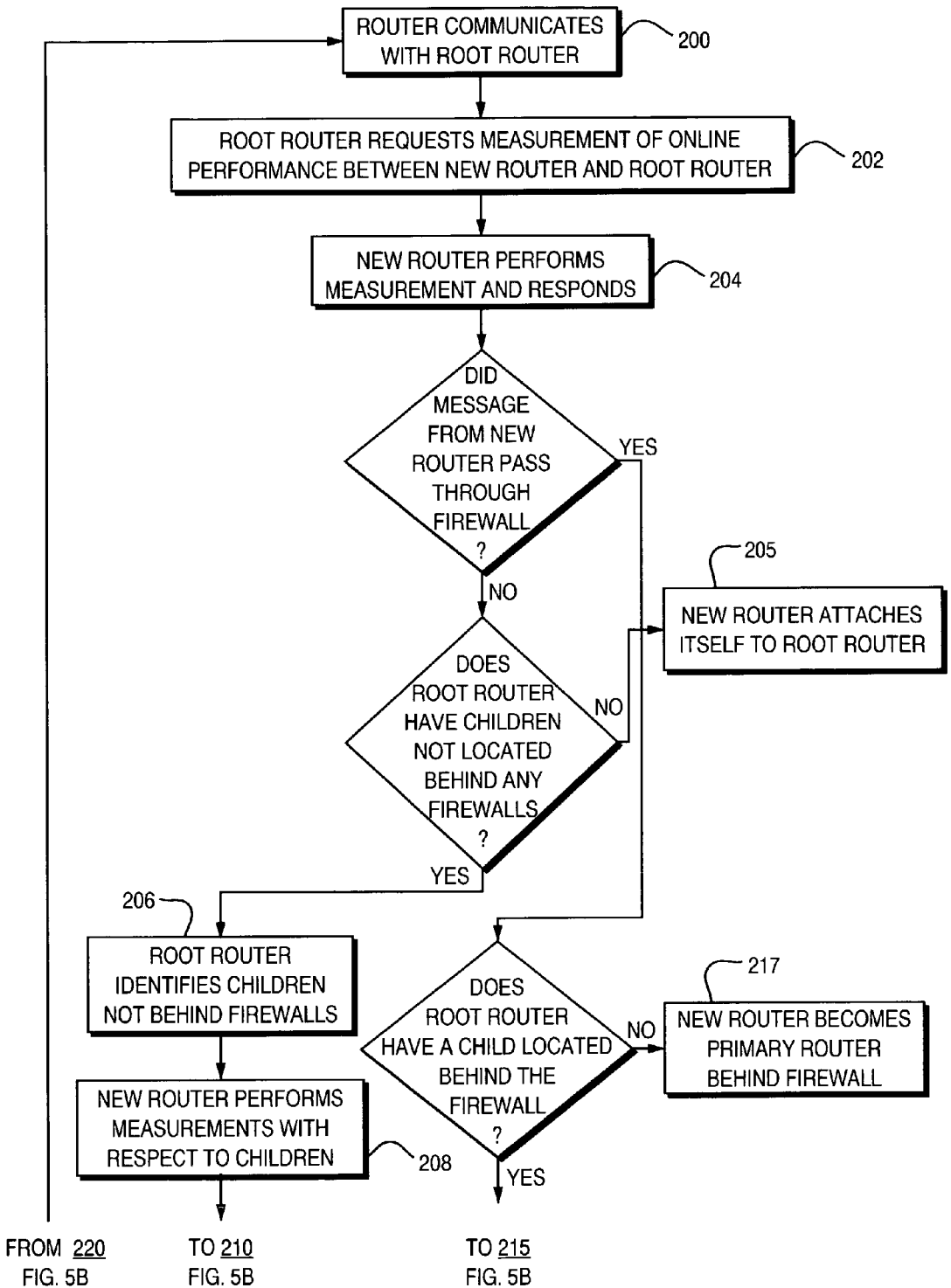
FIG. 5 is a flowchart of the steps of registering or re-registering a router in a hierarchy, according to the self-organization principles of the invention in cases where a firewall is not present and in cases where a firewall is present.
Figure 5B:
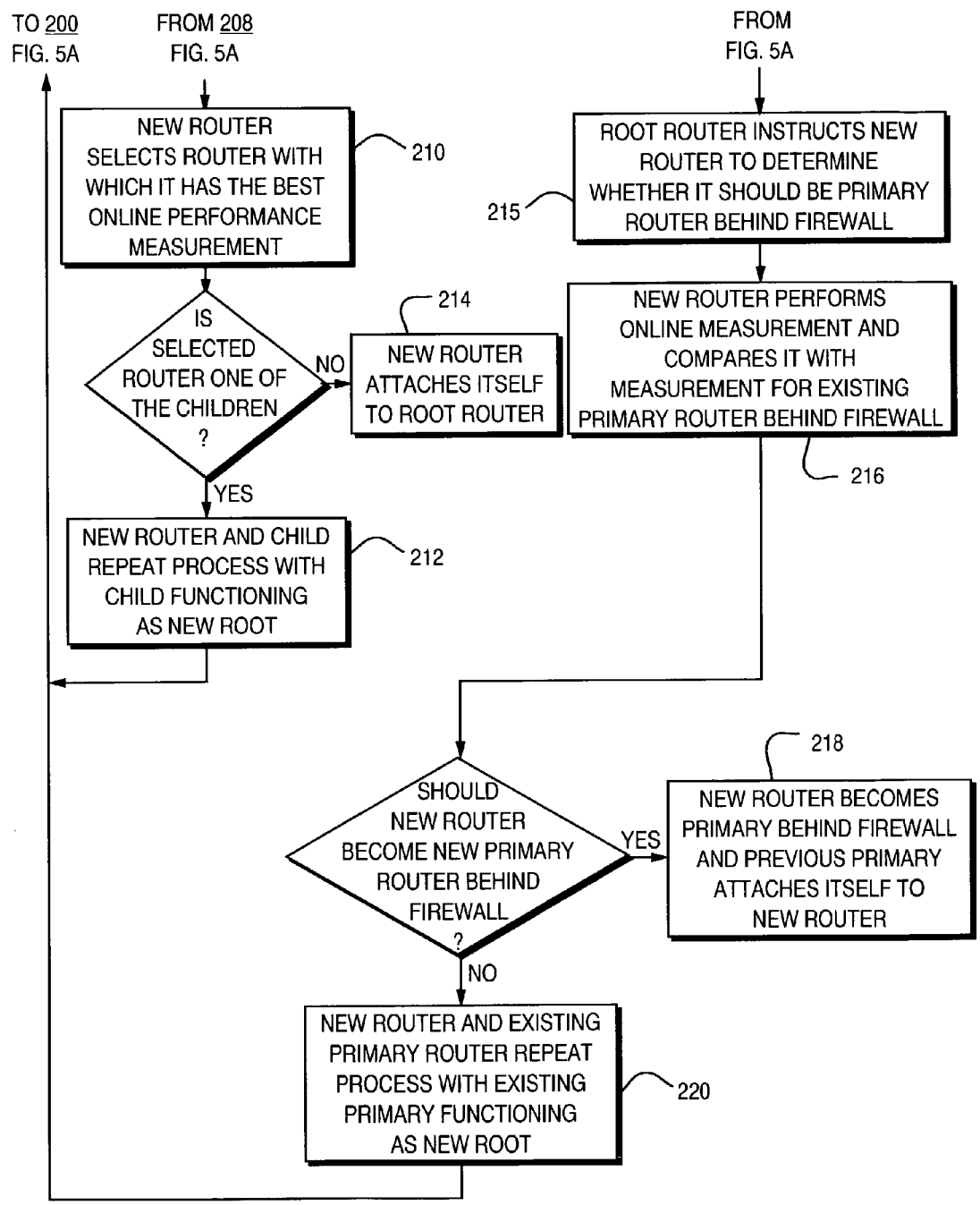

The actual online algorithm for construction of routing hierarchies amounts to deciding, when a given router wants to join the hierarchy, how that router should fit itself into the existing hierarchy. In particular, with reference to FIG. 5, a new router knows through external setup where the root is, and communicates with the root to query which router it should access (step 200), by sending the root router a new router online request. The root router responds by requesting a measurement of online performance between the new router and the root (step 202), and the new router performs the measurement and responds with a child discovery request (step 204).

If the message from the new router did not pass through a firewall and the root router does not have children that are external to firewalls, then the new router attaches itself to the root router (step 205), but if the root router does have at least one child that is not located behind a firewall, the root replies with an identification of its children (step 206). The new router communicates with each of the children in order to determine the performance metric to each of the children (step 208). The new router selects the router (the root or one of the children) for which the new router has the best online performance measurement (step 210). If the new router selects one of the children, the new router and the child router repeat the above-described process (step 212), with the child router functioning as a new root (even though the child router is not the highest router in the hierarchy). If, on the other hand, the new router finds that online performance measurement between the new router and the root router is better than the online performance measurement with respect to each of the root router's children, the new router attaches itself to the root router (step 214).

As described above, during the registration process, a new router that is exploring the hierarchy transmits a child discovery request to the root, and then recursively repeats the process with one of the children serving as a new "root." If a new router transmits a child discovery request to a "root" that does not pass through a firewall, the root will identify as its "children" only those actual children that are not located behind firewalls (step 206). If, on the other hand, a new router transmits a child discovery request to a "root" that does pass through a firewall, and the root already has a child behind the firewall, then the root transmits an instruction to the new router to initiate the above-described process of identifying which router should be the primary router behind the firewall (step 215). If a new router transmits a child discovery request to a "root" that passes through a firewall, and the root does not have a child behind that firewall, then the new router will by default become the primary of the new domain (step 217).

In instances in which a firewall is present, it is necessary to enforce the restriction that there can be only one primary router within the firewall. When a router located behind a firewall decides, by virtue of the process described above, that it should attach itself as a child of a router outside of the firewall, the router must determine whether it would be a better primary router for the firewall than the existing primary router (step 216), based on online performance measurements between the routers behind the firewall and the external router outside of the firewall. If the new router is to be a new primary router behind the firewall, the previous primary router must attach itself as a child of the new primary router (step 218). Otherwise, the new router and the existing primary router repeat the entire above-described process with the existing primary router functioning as a new "root" (step 220). It is important that every router external to the firewall and on the same branch of the hierarchy as the firewall know that this router is the new primary router behind the firewall to which routers outside the firewall should communicate. These routers maintain a routing table in which the fact that the new router is the primary router behind the firewall is recorded.

In the event there is a firewall (or a network address translation device or a proxy) between a new router that is registering itself and a root rooter, and the root already knows that the firewall exists because routers from inside the firewall have previously communicated with the root through that firewall, then the root will know when the new router communicates with it that the new router is communicating through the same firewall. The root understands this because the root recognizes the source address it receives as being the firewall address.

One twist in the process of registering a new router, however, is that once a new router has been attached at a certain place in the hierarchy, with no children of its own, it may be more optimal to attach to the new router other routers already in the hierarchy. In effect, the best topology from the prospective of an efficient bandwidth usage (i.e, the best arrangement of the routing topology for the purpose of avoiding overloading of network links) may require a splicing of the new router into the routing hierarchy so that routers that were previously children of the new router's parent become children of the new router. In order to accomplish this, the various routers in the hierarchy periodically re-register themselves at fixed intervals of time. The re-registration process is the same as the registration process for a new router. The router that re-registers itself may find itself in exactly the same place in the hierarchy where it was previously, but if a new router has been inserted into the hierarchy, the router that re-registers itself may discover the new router and attach itself to the new router, thereby resulting in a dynamic splicing of the hierarchy.

The re-registration process dynamically compensates for changes in topology of the hierarchy, such as a router becoming unreachable, and changes in load at different routers.

Each router has information about all of its children, including coverage zone information, by virtue of this routing registration and re-registration process. Every time a router registers or re-registers itself, it causes its coverage zone information, the coverage zone information for its progeny, and information pertaining to its status as a primary router behind a firewall to be sent to all of its parents in the hierarchy, which store this information in their routing tables along with metrics (e.g., bandwidth) about the coverage zones. The routers may also list their children or progeny, but this step is not necessary because the progeny will themselves register with the parent. Thus, the periodic re-registration serves not only to keep the routing hierarchy built correctly, but it also serves to be the vehicle of propagating coverage zone information. If coverage zone information were to change dynamically for some reason (based, for example, on dynamic surveying of network traffic), this re-registration process will update the coverage zone information stored at routers higher up in the hierarchy and thereby helps those routers make good routing decisions. The routers higher up in the hierarchy provide this stored information to their progeny so that the progeny will have the same capability of routing requests as their parent without requiring any hopping up and down the hierarchy to obtain this information.

Each router maintains information about the topology of the hierarchy beneath that router, including the coverage zones of its progeny. In the case where a firewall is present, it is not necessary for the primary router behind the firewall to communicate up the hierarchy during re-registration the topology of the hierarchy behind the firewall. Rather, it may simply communicate as its preferred and regular coverage zones the external address or addresses (if there is more than one).

A single router can conceivably belong to many routing hierarchies. In a sense, a single physical router may act as many virtual routers, each of the virtual routers belonging to a single one of many different routing hierarchies. For example, a certain router may be an appliance that subscribes to multiple providers of content such as video data. Each provider has its own corresponding routing hierarchy, and the appliance resides at a different location in each hierarchy. Basically the appliance is multiplexed over many content providers, which may even include multiple offices within a single corporation that produce video data.

Other embodiments are within the following claims. For example, when a service request is processed by a router, a field may be incremented in the request before it is redirected that counts the number of times the request has been routed to another router. When this number arrives at a preset value, the request may be immediately serviced rather than routed to another router.

In another embodiment, a service request from a particular client computer may be serviced immediately by the root router rather than redirected to another router. The root router then attempts to find the best source server for the client computer by querying its progeny in the same recursive scheme as in the case of recursive redirection of rooting requests as described above, being careful to use a new message type that identifies the source address of the originating client computer to be used for routing metrics. The root router caches the address of this best router for a preset interval, and the next service request from the client computer received after the best router is determined is dispatched directly by the root router to this best router.

In another embodiment a transparent proxy is insertable anywhere in the network path from a client computer to a root source server. This transparent proxy intercepts and routes service requests from the client computer using the routing algorithm outlined above. This permits routing to be accomplished without modifying the server that is described in a universal resource locator (URL), while still providing routing functionality.

What is claimed is:

1. A method for routing requests for data from a client between a plurality of routers in a network, the method comprising:

at a router in a replica routing system:

receiving a client request for data;

comparing originating address information in the received client request to coverage zone information associated with i) the router that received the request and ii) a hierarchy of routers that are the router's progeny, the coverage zone information being stored in a database associated with the router that received the request, the coverage zone information including a first set of coverage zone information and a second set of coverage zone information for respective a first type coverage zone and a second type coverage zone, the first set of coverage zone information including a restrictive set of addresses associated with requests for which corresponding routers in the first type coverage zone believe that they would be at least as good as any other router in the hierarchy at servicing the requests, the second set of coverage zone information including a larger set of addresses than that associated with the first set of coverage zone information, routers in the second type coverage zone being able to service the requests but for which the routers do not know whether they are an optimal router for servicing the requests; and based on the comparing:

forwarding, if the router is not within the first type coverage zone, the client request message to a successive router within the first type coverage zone; and forwarding, if the originating address information corresponds to a router in the second type of coverage zone, the client request message to a successive router within the second type coverage zone.

2. The method of claim 1 wherein forwarding further comprises redirecting a request message from a router outside a firewall to a successive router on an opposed browser side of the firewall.

3. The method of claim 1 wherein the first type and second type coverage zones are defined by firewalls operable to selectively pass request messages according to predetermined security criteria.

4. The method of claim 1 wherein determining the type of zone further comprises identifying a successive router as the root node, the root node having a firewall and further, being the only node on a browser side of the firewall in communication with the router receiving the request on an opposed side of the firewall.

5. The method of claim 1 wherein forwarding occurs according to a combination of restrictive and open routing policies.

6. The method of claim 1 wherein the coverage zone information stored in repository accessible by the router.

7. A method as in claim 1 further comprising:
at the router in the replica routing system:
based on communications from source nodes that can service a respective client request, maintaining additional information regarding a preferred coverage zone and a regular coverage zone associated with the source nodes, the preferred coverage zone being a restrictive set of addresses for which the router believes that it would be at least as good as any other router at serving a request from one of those addresses, the regular coverage zone being a set of addresses in which the router does not know whether that it is an optimal router to service the client request, each of the coverage zones including respective sets of addresses associated with the router independent of where the router is located in the hierarchy.

8. A method as in claim 7 further comprising:
constructing the hierarchy so that routers lower in the hierarchy provide a faster corresponding network connectivity than a root router of the hierarchy; and
selecting a lowest matching router in the hierarchy to redirect the client request.

9. A method as in claim 8 in which the router registers itself, when booting up, with the hierarchy by determining a place for itself in the hierarchy, the router navigating at a top of the hierarchy, where the router decides whether it should attach itself to the top router in the hierarchy or to a child in the hierarchy, the router determining whether to be attached to the child rather than to the top based on a determination of metrics associated with the router and its ability to service requests for data relative to an ability of other routers in the hierarchy to service the requests.

10. A method as in claim 9, wherein the router is a root router in the hierarchy, the method further comprising:
controlling a number of browser that can obtain content from the root router by distributing the content among routers in the hierarchy and pushing the content from the root router to its children, the children further pushing the content to yet other routers lower in the hierarchy.

11. A method as in claim 1 further comprising:
generating the hierarchy such that only one of multiple routers behind a firewall is known by routers on an external side of the firewall with respect to a browser generating the client request, routers on a browser's side of the firewall being subordinate to a router at a top of the hierarchy of routers inside the firewall; and
when the router receiving the client request for data is on the external side of the firewall and receives the request, redirecting the request to the router at the top of the hierarchy on the browser's side of the firewall so that the top router can make a decision as to whether to serve the data or whether to delegate in a recursive manner by redirecting the request to another router in the hierarchy.

12. A method as in claim 11 further comprising:
arbitrarily selecting which router is the top router in the hierarchy depending on which of multiple routers is a first router that happens to access a router on the external side of the firewall, other routers inside the firewall then being required to support the top router of the hierarchy.

13. A router for routing client request messages, the router comprising:
an interface operable to interconnect the router to a plurality of servers, the router disposed in a particular type of coverage zone;
a memory; and
a controller in communication with the memory and the interface, the controller operable to:
receive a client request for data;
compare originating address information in the received client request to coverage zone information associated with i) the router that received the request and ii) a hierarchy of routers that are the router's progeny, the coverage zone information being stored in a database associated with the router that received the request, the coverage zone information including a first set of coverage zone information and a second set of coverage zone information for respective a first type coverage zone and a second type coverage zone, the first set of coverage zone information including a restrictive set of addresses associated with requests for which corresponding routers in the first type coverage zone believe that they would be at least as good as any other router in the hierarchy at servicing the requests, the second set of coverage zone information including a larger set of addresses than that associated with the first set of coverage zone information, routers in the second type coverage zone being able to service the requests but for which the routers do not know whether they are an optimal router for servicing the requests; and
based on the compare:
forward, if the router is not within the first type coverage zone, the client request message to a successive router within the first type coverage zone; and
forward, if the originating address information corresponds to a router in the second type of coverage zone, the client request message to a successive router within the second type coverage zone.

14. The router of claim 13 wherein the controller is further operable to determine the type of zone by storing, from previous request messages, address information indicative of a source address of the previous request messages.

15. The router of claim 13 wherein the controller is further operable to forward the request message from a data communications device outside a firewall to a successive router on an opposed browser side of the firewall.

16. The router of claim 13 wherein the first type and second type coverage zones are defined by firewalls operable to selectively pass request messages according to predetermined security criteria.

17. The router of claim 13 wherein the controller is further operable to identify the successive router as a root node for redirecting, the root node having a firewall and further, being the only node in on a browser side of the firewall in communication with the router receiving the request on an opposed side of the firewall.

18. The router of claim 13 wherein the controller is operable to forward request messages according to a combination of restrictive and open routing policies.

19. A method of routing in a replica routing system, the method comprising:
at a first router in the replica routing system:
receiving a request;
comparing an address from which the request purports to originate with coverage zone information associated with i) the first router that received the request and ii) a corresponding hierarchy of routers that are a progeny of the first router, the coverage zone information including an indication of specific routers in the corresponding hierarchy and particular addresses of requests that the specific routers are able to service;
based on the comparing, identifying a second router in the corresponding hierarchy of routers;
redirecting the request to the second router in the corresponding hierarchy of routers, the second router being lower in the corresponding hierarchy than the first router; and
accessing the coverage zone information which is stored in a database associated with the first router that received the request, the coverage zone information for the first router that received the request including a preferred coverage zone and a regular coverage zone of information, the preferred coverage zone being a restrictive set of addresses for which a first set of respective routers believe that they would be at least as good as any other router in the corresponding hierarchy at serving a request from addresses in the restrictive set of addresses, the regular coverage zone being a larger set of addresses than the preferred coverage zone for which a second set of respective routers would be willing to serve the request if the request came from one of the larger set addresses, but for which a given router in the second set does not know whether it is optimal for servicing the request,
wherein identifying the second router includes:
if the address corresponds to a particular router in the preferred coverage zone, redirecting the request from the first router to the particular router in the corresponding hierarchy; and
if a router is not identified for which the address corresponds to a router in the preferred coverage zone, but a router other than the first router that received the request is identified for which the which the address is within a regular coverage zone, redirecting the request to the router for which the address is within the regular coverage zone.

20. A method as in claim 19, wherein redirecting the request message includes notifying an originator of the request to resend the request to the second router and the corresponding hierarchy is a hierarchical tree and includes parent-child relationships of routers in the replica routing system.

21. A method as in claim 20 further comprising:
at the second router:
receiving the redirected request;
comparing an address from which the request purports to originate with coverage zone information associated with i) the second router that received the request and ii) a corresponding hierarchy of routers that are a progeny of the second router, the coverage zone information including an indication of specific routers in the corresponding hierarchy and particular addresses of requests that the specific routers are able to service;
based on the comparing, identifying a third router in the corresponding hierarchy of routers; and
redirecting the request to the third router in the corresponding hierarchy of routers, the third router being a router lower in the corresponding hierarchy than the second router.

22. A method as in claim 21 further comprising:
redirecting the request to successively lower routers in the hierarchy of routers until a given router to which an originator sends the redirected request concludes that that the given router is an appropriate router to service the request, the hierarchy of routers being independent of a path of routers on which the request travels to the first router.

23. A method as in claim 19, wherein identifying a second router in the corresponding hierarchy of routers further includes identifying multiple possible preferred routers in the corresponding hierarchy in which to redirect the request, each of the multiple possible preferred routers respectively believing that they would be at least as good as any other router to service the request, the method further comprising:
selecting a lower one of the multiple possible preferred routers in the corresponding hierarchy in which to redirect the request.

24. A method as in claim 19, wherein identifying a second router in the corresponding hierarchy of routers further includes identifying multiple routers in the corresponding hierarchy in which to redirect the request, the method further comprising:
selecting a less loaded router from the multiple routers to redirect the request.

25. A method as in claim 19, wherein the first router is a root router in the corresponding hierarchy and the request originates from a browser, the request being propagated to the second router independent of a path the request travels from the browser to the first router.

26. A method as in claim 19, wherein the coverage zone information includes two sets of information, a first set of information identifying a list of preferred routers in the corresponding hierarchy capable of servicing requests and a second set of coverage zone information identifying routers in the corresponding hierarchy that would be willing to service the requests but do not know whether they would be optimal to service the requests.

27. A method as in claim 19, wherein the method includes the first router attempting to match the address to one of a restrictive set of addresses associated with respective routers to identify a preferred router for redirecting the request and, if the attempting fails, further attempting to match the address to one of a larger set of addresses than the restrictive set of addresses, the larger set of addresses being based on an open policy and corresponding to non-preferred routers for redirecting the request.

28. A method as in claim 19 further comprising:

propagating children coverage zone information from respective routers lower in the corresponding hierarchy up to parent routers in the corresponding hierarchy, the parent routers utilizing the children coverage zone information to identify to which router in the corresponding hierarchy to redirect the request.

29. A method as in claim 19, wherein the first router is a root router in the corresponding hierarchy, the method further comprising:

receiving a request from a new router wishing to join the corresponding hierarchy;

determining at which point the new router fits into the corresponding hierarchy by measuring an on-line performance between the first router and the new router; and enabling registration of new routers into the corresponding hierarchy.

30. A method as in claim 29 further comprising:

determining at which point the new router fits into the corresponding hierarchy by measuring performance of the new router and other routers in the corresponding hierarchy.

31. A method as in claim 19 further comprising:

constructing the hierarchy so that routers lower in the hierarchy provide a faster corresponding network connectivity than a root router of the hierarchy.

32. A method as in claim 19 further comprising:

generating the hierarchy in the replica routing system such that only one of multiple routers behind a firewall is known by routers on an external side of the firewall with respect to a browser generating the client request, routers on a browser's side of the firewall being subordinate to a router at a top of the hierarchy of routers inside the firewall; and when the router receiving the client request for data is on the external side of the firewall and receives the request, redirecting the request to the router at the top of the hierarchy on the browser's side of the firewall so that the top router can make a decision as to whether to serve the data or whether to delegate in a recursive manner by redirecting the request to another router in the hierarchy.

33. A method as in claim 32 further comprising:

arbitrarily selecting which router is the top router in the hierarchy depending on which of multiple routers is a first router that happens to access a router on the external side of the firewall, other routers inside the firewall then being required to support the top router of the hierarchy.

* * * * *

UNITED STATES PATENT AND TRADEMARK OFFICE
CERTIFICATE OF CORRECTION

PATENT NO.     : 6,970,944 B2
DATED          : November 29, 2005
INVENTOR(S)    : Kirk L. Johnson and M. Frans Kaashoek It is certified that error appears in the above-identified patent and that said Letters Patent is hereby corrected as shown below:

Column 15,
Line 20, "stored in respository" should read -- stored in a respository --.

Signed and Sealed this

Seventh Day of February, 2006

JON W. DUDAS
*Director of the United States Patent and Trademark Office*